US012802360B2

(12) United States Patent
Huang et al.

(10) Patent No.: US 12,802,360 B2
(45) Date of Patent: Nov. 17, 2026

(54) IMAGE GENERATION METHOD AND APPARATUS, DEVICE, STORAGE MEDIUM, AND COMPUTER PROGRAM PRODUCT

(71) Applicant: TENCENT TECHNOLOGY (SHENZHEN) COMPANY LIMITED, Shenzhen (CN)

(72) Inventors: Yawen Huang, Shenzhen (CN); Yefeng Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 369 days.

(21) Appl. No.: 18/386,940

(22) Filed: Nov. 3, 2023

(65) Prior Publication Data

US 2024/0078756 A1 Mar. 7, 2024

Related U.S. Application Data

(63) Continuation of application No. PCT/CN2022/137135, filed on Dec. 7, 2022.

(30) Foreign Application Priority Data

Mar. 15, 2022 (CN) ........................ 202210255541.3

(51) Int. Cl.
*G06T 19/00* (2011.01)
*G06T 7/12* (2017.01)
(Continued)

(52) U.S. Cl.
CPC ................ *G06T 19/00* (2013.01); *G06T 7/12* (2017.01); *G06T 7/174* (2017.01); *G06T 7/40* (2013.01);
(Continued)

(58) Field of Classification Search
CPC ........... G06T 19/00; G06T 7/12; G06T 7/174; G06T 7/40; G06T 15/04; G06T 2200/04;
(Continued)

(56) References Cited

U.S. PATENT DOCUMENTS 11,615,267 B2 * 3/2023 Ghesu .................. G06F 18/214 382/131
2020/0111194 A1 4/2020 Wang et al.
(Continued)

FOREIGN PATENT DOCUMENTS

CN 111862174 A 10/2020
CN 112967178 A 6/2021
(Continued)

OTHER PUBLICATIONS

The World Intellectual Property Organization (WIPO) International Search Report for PCT/CN2022/137135 Feb. 21, 2023 6 Pages (including translation).

(Continued)

*Primary Examiner* — Abderrahim Merouan
(74) *Attorney, Agent, or Firm* — ANOVA LAW GROUP, PLLC

(57) ABSTRACT

An image generation method includes obtaining a modality image corresponding to a first modality, and performing modality conversion on the modality image through a first candidate network to obtain a generated image corresponding to a second modality different from the first modality. The generated image is a three-dimensional image. The method further includes performing modality restoration on the generated image through a second candidate network to obtain a restored image corresponding to the first modality and obtaining a constraint loss value based on a modality conversion effect of the generated image and a modality restoration effect of the restored image. The constraint loss (Continued)

value indicates a mapping loss in mapping the modality image to a three-dimensional image space by the first candidate network. The method also includes training the first candidate network based on the constraint loss value to obtain an image conversion network.

20 Claims, 8 Drawing Sheets

(51) Int. Cl.

| | |
|---|---|
| ***G06T 7/174*** | (2017.01) |
| ***G06T 7/40*** | (2017.01) |
| ***G06T 15/04*** | (2011.01) |

(52) U.S. Cl.
CPC .......... *G06T 15/04* (2013.01); *G06T 2200/04* (2013.01); *G06T 2207/20021* (2013.01); *G06T 2207/20076* (2013.01); *G06T 2207/20081* (2013.01); *G06T 2207/20084* (2013.01); *G06T 2210/32* (2013.01); *G06T 2210/41* (2013.01)

(58) Field of Classification Search
CPC . G06T 2207/20021; G06T 2207/20076; G06T 2207/20081; G06T 2207/20084; G06T 2210/32; G06T 2210/41
See application file for complete search history.

(56) References Cited

U.S. PATENT DOCUMENTS

| | | | | |
|---|---|---|---|---|
| 2021/0038198 | A1 | 2/2021 | Jacob et al. | |
| 2021/0383538 | A1* | 12/2021 | Deasy | G06N 3/088 |
| 2022/0198738 | A1* | 6/2022 | Xu | G06T 19/20 |
| 2023/0386048 | A1 | 11/2023 | Song et al. | |
| 2024/0078756 | A1* | 3/2024 | Huang | G06T 15/04 |
| 2024/0185509 | A1* | 6/2024 | Kovler | G06T 7/11 |
| 2024/0213103 | A1* | 6/2024 | Chen | H01L 22/34 |
| 2025/0266159 | A1* | 8/2025 | Rajpurkar | G16H 15/00 |

FOREIGN PATENT DOCUMENTS

| | | | |
|---|---|---|---|
| CN | 113112559 | A | 7/2021 |
| CN | 114612618 | A | 6/2022 |

OTHER PUBLICATIONS

Snehashis Roy et al., "Magnetic resonance image example-based contrast synthesis." IEEE transactions on medical imaging 32.12 (2013): 2348-2363.

Phillip Isola et al. "Image-to-image translation with conditional adversarial networks." Proceedings of the IEEE conference on computer vision and pattern recognition. 2017.

Jun-Yan Zhu et al. "Unpaired image-to-image translation using cycle-consistent adversarial networks." Proceedings of the IEEE international conference on computer vision. 2017.

* cited by examiner

IMAGE GENERATION METHOD AND APPARATUS, DEVICE, STORAGE MEDIUM, AND COMPUTER PROGRAM PRODUCT

CROSS-REFERENCE TO RELATED APPLICATIONS

This application is a continuation of International Application No. PCT/CN2022/137135, filed on Dec. 7, 2022, which claims priority to Chinese Patent Application No. 202210255541.3 filed on Mar. 15, 2022 and entitled "IMAGE GENERATION METHOD AND APPARATUS, DEVICE, STORAGE MEDIUM, AND COMPUTER PROGRAM PRODUCT," which are incorporated by reference in their entirety.

FIELD OF THE TECHNOLOGY

This application relates to the field of machine learning, and particularly relates to an image generation method and apparatus, a device, a storage medium, and a computer program product.

BACKGROUND OF THE DISCLOSURE

Cross-modality image synthesis is used for modality conversion of images between different modality images so that modality images of other different modalities are synthesized based on one modality image. Different modality images refer to that the images are obtained in different manners. For example, such as an X-ray image obtained by X-RAY and magnetic resonance imaging (MRI) obtained by magnetic resonance, which correspond to two different modality images, or the different modality images mean that styles of the images are different.

In the related art, an image generative model is usually obtained by training a generative adversarial network (GAN) to generate images of different modalities. In the training process, the GAN network is trained by sample images and reference images, where the sample images and the reference images are predetermined sample image groups with a matching relationship.

However, in the above-mentioned method, the GAN network usually needs to be trained by adopting the sample image group with the matching relationship. Since the samples used for training need to have the matching relationship, the sample image group would be difficult to obtain. Further, in the process of practical application, the difference between different modality images is large, resulting in low accuracy of an output result of the GAN network and poor model performance.

SUMMARY

In accordance with the disclosure, there is provided an image generation method including obtaining a modality image corresponding to a first modality, and performing modality conversion on the modality image through a first candidate network to obtain a generated image corresponding to a second modality. The generated image is a three-dimensional image, and the first modality and the second modality are different from each other. The method further includes performing modality restoration on the generated image through a second candidate network to obtain a restored image corresponding to the first modality and obtaining a constraint loss value based on a modality conversion effect of the generated image and a modality restoration effect of the restored image. The constraint loss value indicates a mapping loss in mapping the modality image to a three-dimensional image space by the first candidate network. The method also includes training the first candidate network based on the constraint loss value to obtain an image conversion network.

Also in accordance with the disclosure, there is provided computer device including one or more processors and one or more memories storing at least one program that, when executed by the one or more processors, causes the one or more processors to obtain a modality image corresponding to a first modality, and perform modality conversion on the modality image through a first candidate network to obtain a generated image corresponding to a second modality. The generated image is a three-dimensional image, and the first modality and the second modality are different from each other. The at least one program further causes the one or more processors to perform modality restoration on the generated image through a second candidate network to obtain a restored image corresponding to the first modality, and obtain a constraint loss value based on a modality conversion effect of the generated image and a modality restoration effect of the restored image. The constraint loss value indicates a mapping loss in mapping the modality image to a three-dimensional image space by the first candidate network. The at least one program further causes the one or more processors to train the first candidate network based on the constraint loss value to obtain an image conversion network.

Also in accordance with the disclosure, there is provided a non-transitory computer-readable storage medium storing at least one program that, when executed by one or more processors, causes the one or more processors to obtain a modality image corresponding to a first modality, and perform modality conversion on the modality image through a first candidate network to obtain a generated image corresponding to a second modality. The generated image is a three-dimensional image, and the first modality and the second modality are different from each other. The at least one program further causes the one or more processors to perform modality restoration on the generated image through a second candidate network to obtain a restored image corresponding to the first modality, and obtain a constraint loss value based on a modality conversion effect of the generated image and a modality restoration effect of the restored image. The constraint loss value indicates a mapping loss in mapping the modality image to a three-dimensional image space by the first candidate network. The at least one program further causes the one or more processors to train the first candidate network based on the constraint loss value to obtain an image conversion network.

DESCRIPTION OF EMBODIMENTS

First, terms referred to in embodiments of this application are briefly described.

Modality: each source or form of information may be a modality. For example, a human being has senses of touch and hearing; media of the information includes voice, video, text, etc.; a wide variety of sensors such as radar, infrared, accelerometer, etc., each of which may be referred to as a modality.

In embodiments of this application, different forms of images are taken as different modality images. For example, an X-ray image is a kind of modality image, a computed tomography (CT) image is a kind of modality image, magnetic resonance imaging (MRI) is a kind of modality image, etc. Image information focuses reflected by different modality images are different. The X-ray image may more clearly show the bone, the CT image may reflect the tissue and bleeding condition, and the MRI image is suitable for observing soft tissue.

Generative adversarial network (GAN): an unsupervised deep learning model. The GAN network includes at least two modules: a generative model and a discriminative model. In the training process of the models, the two models learn from each other to train the GAN network to improve the accuracy of model output results.

Figure 1:
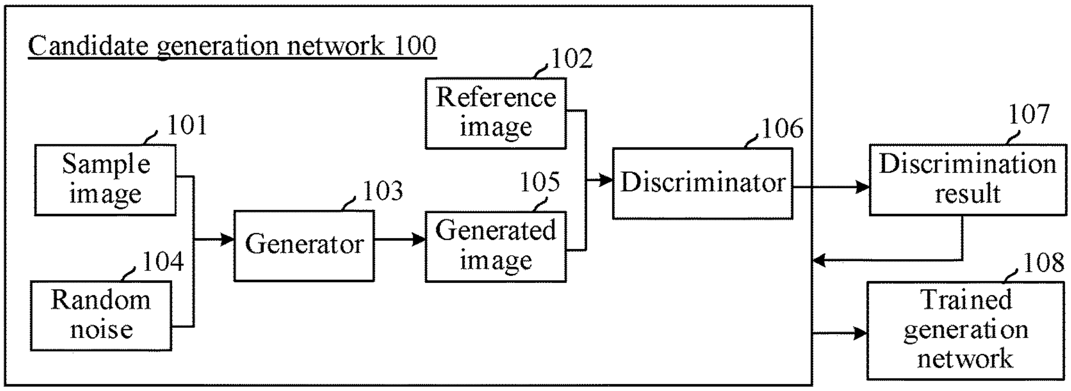
FIG. 1 is a schematic diagram of an image generation method provided by an exemplary embodiment of this application.

FIG. 1 illustrates a schematic diagram of image generation provided by an exemplary embodiment of this application. As shown in FIG. 1, for a training task of image generation, a candidate generation network 100 is set to train the same. First, a sample image 101 and a reference image 102 are obtained, where the sample image 101 and the reference image 102 are a sample image group with a matching relationship. A generated image 105 is obtained by inputting the sample image 101 into a generator 103 and adding random noise 104. The reference image 102 and the generated image 105 are inputted into a discriminator 106 to obtain a discrimination result 107 corresponding to the generated image 105 and the reference image 102, where if the generated image 105 is consistent with the reference image 102, the discrimination result 107 is "1", and if the generated image 105 is inconsistent with the reference image 102, the discrimination result 107 is "0". The candidate generation network 100 is trained according to the discrimination result 107 to finally obtain a trained generation network 108.

In the above-mentioned technology, a pre-configured sample image group is usually adopted to train a candidate generation network. However, it is difficult to obtain the sample image group with the matching relationship due to the great difference between images. Further, in practical use, the trained generation network obtained in the training process has a poor generalization performance, resulting in a low accuracy of an output result, which cannot meet the task requirements.

In the image generation method provided by this application, modality conversion and modality restoration are performed on a first modality image through a first candidate network and a second candidate network to obtain a first generated image belonging to a second modality and a first restored image belonging to a first modality. A corresponding constraint loss value of the first candidate network in a three-dimensional image space is determined according to the first generated image and the first restored image so that a manner for training the first candidate network can make the effect of a three-dimensional image generated by a final trained image conversion network better; that is, the training effect of the image conversion network can be improved by introducing the three-dimensional image space in the first candidate network, thereby making an outputted three-dimensional image more accurate.

Figure 2:
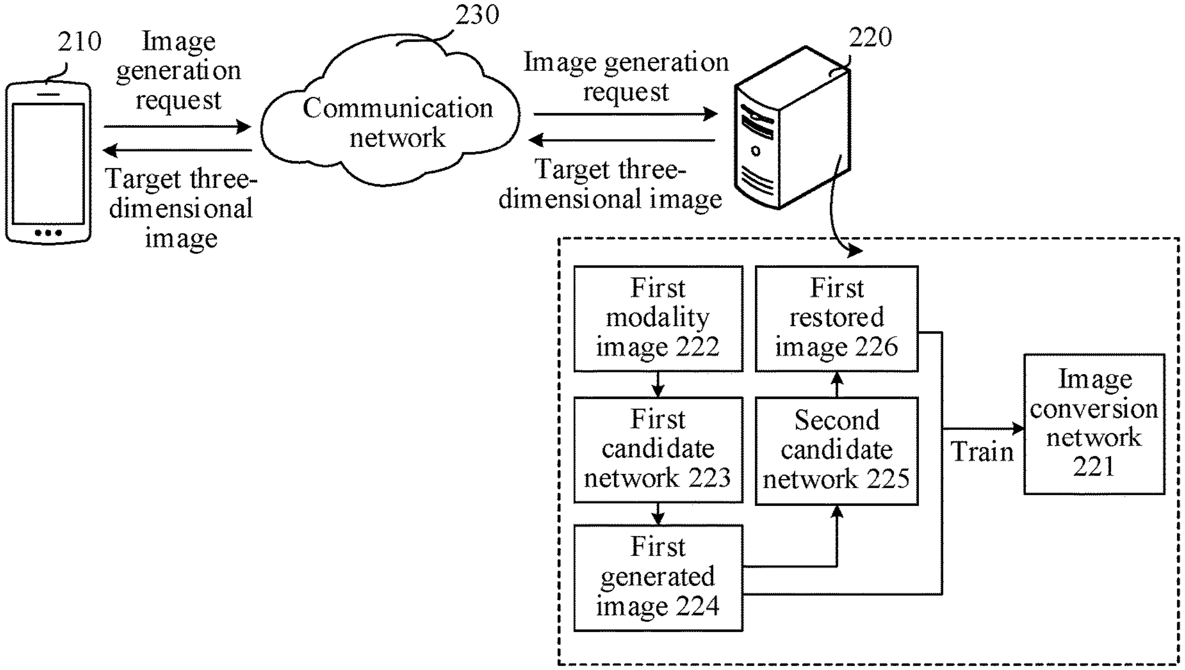
FIG. 2 is a schematic diagram of an implementation environment provided by an exemplary embodiment of this application.

Next, an implementation environment related to embodiments of this application is described. Illustratively, referring to FIG. 2, the implementation environment relates to a terminal 210 and a server 220, and the terminal 210 and the server 220 are connected to each other through a communication network 230.

In some embodiments, the terminal 210 transmits an image generation request to the server 220, where the image generation request contains an original image for performing modality conversion. After receiving the image generation request transmitted from the terminal 210, the server 220 performs modality conversion on the original image to generate a three-dimensional image corresponding to the original image, and feeds back the three-dimensional image to the terminal 210.

The server 220 contains an image conversion network 221 which generates a first generated image 224 after inputting a first modality image 222 into a first candidate network 223; a first restored image 226 is obtain by inputting the first generated image 224 into a second candidate network 225; a constraint loss value is determined according to the first generated image 224 and the first restored image 226 so as to train the first candidate network 223, and finally the image conversion network 221 is obtained.

The above-mentioned terminal 210 may be a terminal device in various forms, such as a mobile phone, a tablet computer, a desktop computer, a portable notebook computer, a smart television, and a smart vehicle, and embodiments of this application do not limit this.

The above-mentioned server 220 may be an independent physical server, may also be a server cluster or a distributed system composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, a content delivery network (CDN), and a large data and artificial intelligence platform.

Cloud technology (Cloud technology) refers to a hosting technology that unifies a series of resources such as hardware, software, and network in a wide area network or a local area network to realize calculation, storage, processing, and sharing of data. In some embodiments, the above-mentioned server 220 may also be implemented as a node in a blockchain system.

Information (including but not limited to user device information, user personal information, etc.), data (including but not limited to data used for analysis, stored data, presented data, etc.), and signals involved in this application are authorized by a user or fully authorized by all parties, and collection, use, and processing of relevant data shall comply with relevant laws and regulations and standards of relevant countries and regions. For example, brain images referred to in this application for training are obtained with sufficient authorization.

In conjunction with the introduction of the above-mentioned terms and the implementation environment, application scenes of this application are exemplified.

1. Apply to a medical scene. Taking the current task being generating a three-dimensional brain image as an example, a sample brain image contained in a public dataset is obtained, and modality conversion is performed on the sample brain image through the first candidate network to obtain a brain generated image. The brain generated image is a three-dimensional image corresponding to the sample brain image. Modality restoration is performed on the brain generated image through the second candidate network to obtain a brain restored image, and a constraint loss value is determined according to the brain generated image and the brain restored image. The first candidate network is trained according to the constraint loss value to obtain the image conversion network, which is used for converting a brain image inputted in the first modality into a three-dimensional brain image of the second modality, for subsequently performing image segmentation on the brain image for auxiliary diagnosis and treatment, such as a T1 weighted image is converted into a T2 weighted MRI image.
2. Apply to an advertisement scene. In order to obtain more advertisement materials, a sample advertisement material of the first modality is inputted into the first candidate network to perform modality conversion, and a sample generated image of the second modality is generated. The sample generated image is a corresponding three-dimensional image under the second modality. The sample generated image is inputted into the second candidate network to perform modality restoration to obtain a sample restoration image of the first modality. A constraint loss value is determined according to the sample restoration image and the sample generated image to train the first candidate network, and a material conversion network is obtained. In an application process, selected materials are inputted into the material conversion network to output three-dimensional material images under different modalities corresponding to the selected materials for improving the material generation efficiency.

The above-mentioned application scenes are merely illustrative examples, and the application scenes of the image generation method in embodiments of this application are not limited. In addition, a classification prediction method may also be used in application scenes for realizing medical image alignment, image style migration, etc.

Figure 3:
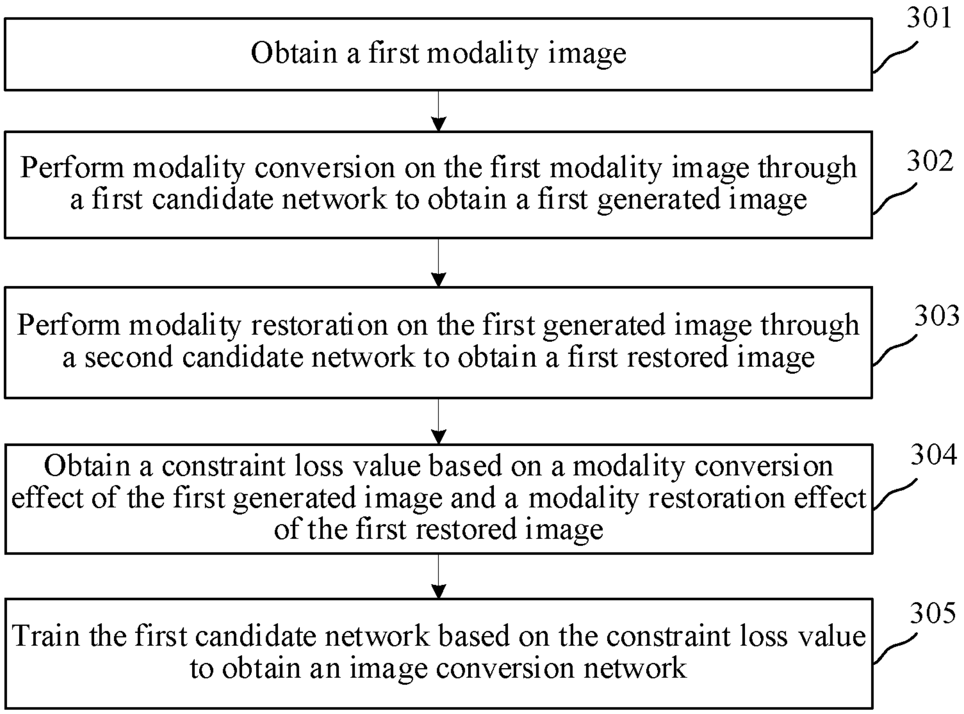
FIG. 3 is a flowchart of an image generation method provided by an exemplary embodiment of this application.

Illustratively, the image generation method provided by this application is described. FIG. 3 illustrates a flowchart of an image generation method provided by an exemplary embodiment of this application. The method may be performed by a terminal, may be performed by a server, or may also be performed by both the terminal and the server, and in some embodiments, the method being performed by the server is taken as an example to describe. As shown in FIG. 3, the method includes the following steps.

Step 301: Obtain the first modality image.

The first modality image corresponds to the first modality.

Illustratively, the first modality image is an image corresponding to the first modality.

Alternatively, the first modality is determined according to a style type of the image, such as a corresponding image under the current first modality is a caricature image, and images under other modalities are real images of characters; alternatively, the first modality is determined according to a color value of the image, such as the corresponding image under the current first modality is a gray-scale image; alternatively, the first modality is determined according to the specific content of the image, such as a cat is included in the current first modality image content, which is not limited thereto.

Illustratively, the first modality image is a sample training image in a public training dataset, which is not limited thereto.

Alternatively, obtaining the first modality image includes obtaining from a locally stored image dataset, or downloading from the public training dataset, which is not limited thereto.

Step 302: Perform modality conversion on the first modality image through the first candidate network to obtain the first generated image.

The first generated image corresponds to the second modality and is the three-dimensional image, and the first modality and the second modality are different modalities.

In some embodiments, the first candidate network is a network for performing modality conversion on an inputted first modality image.

Alternatively, the first modality and the second modality differ in that data sources corresponding to their respective images are different, such as the image of the first modality is an image downloaded on a website, and the image of the second modality is an image obtained by photographing; or the first modality and the second modality differ in that data content types corresponding to their respective images are different, such as the image of the first modality is a cartoon image and the image of the second modality is a realistic image, which is not limited thereto.

In some embodiments, the first generated image is an image generated after the first candidate network performing modality conversion on the first modality image corresponding to the first modality, and the first generated image corresponds to the second modality, indicating that the first generated image and the first modality image correspond to different modalities.

Alternatively, the first generated image and the first modality image do not have a content corresponding relationship, such as a dog is contained in the first modality image, but a zebra is contained in the first generated image; or the first generated image and the first modality image have an image content corresponding relationship, namely, image contents corresponding to the first generated image and the first modality image are consistent, such as the image content contained in both the first modality image and the first generated image is a cat, which is not limited thereto.

Illustratively, the modality conversion includes the following several conversion manners.

1. The modality conversion includes a reorganization of pixel point sequences, namely, pixel point distribution sequences in the first modality image are obtained, and the modality conversion is realized by adjusting the pixel point distribution sequences.

2. The modality conversion includes dimension conversion, such as the first modality image corresponds to a first type dimension image (such as a two-dimensional image), and a first generated image obtained after mapping the same to a second type dimension space is a second type dimension image (such as a three-dimensional image).
3. The modality conversion includes feature fusion, namely, element features corresponding to the pixel points corresponding to the first modality image are obtained, and the modality conversion is realized by fusing the element features.
4. The modality conversion includes threshold conversion, namely, threshold information of regions corresponding to the first modality image is obtained, and the modality conversion is realized by adjusting the threshold information of the regions, such as the first modality image contains a region a and a region b, where a color of the region a is more prominent, and a color of the region b of the first generated image generated after threshold conversion is more prominent.

The above-mentioned modality conversion manners are merely illustrative examples, and embodiments of this application do not limit this.

Alternatively, the modality conversion is a random conversion or a conversion according to a specified rule, such as converting the realistic image into the cartoon image, which is not limited thereto.

Alternatively, the first modality and the second modality have an associated relationship, such as the first modality and the second modality are both brain images, but correspond to different types (the Mill image and the CT image); or the first modality and the second modality do not have the associated relationship, which is not limited thereto.

Step 303: Perform modality restoration on the first generated image through a second candidate network to obtain a first restored image.

The first restored image corresponds to the first modality.

Illustratively, the first restored image is an image corresponding to the first modality after the modality restoration.

Alternatively, the first restored image is the same as or different from the first modality image, which is not limited thereto.

Illustratively, the modality restoration includes at least one of the following several manners.

1. The modality restoration includes restoration of pixel point distribution, namely, pixel point distributions in the first generated image are obtained, and the modality restoration is realized by performing arrangement and reorganization on the first modality corresponding to each pixel point distribution.
2. The modality restoration includes dimension restoration, namely, a first restored image obtained by mapping the first generated image to a first type dimension space is a first type dimension image (such as the two-dimensional image).
3. The modality restoration includes feature decomposition, namely, an image feature corresponding to the first generated image is obtained, and the modality restoration is realized by performing structure decomposition on the image feature.
4. The modality restoration includes threshold restoration, namely, region threshold information corresponding to the first modality image is obtained, and the modality restoration is realized by restoring the region threshold information.

The above-mentioned modality restoration manners are merely illustrative examples, and embodiments of this application do not limit this.

Alternatively, the first candidate network and the second candidate network are networks of the same architecture type; or the first candidate network and the second candidate network are networks of different architecture types, which is not limited thereto.

Step 304: Obtain a constraint loss value based on a modality conversion effect of the first generated image and a modality restoration effect of the first restored image.

The modality conversion effect is used for indicating a conversion effect from the first modality image to the first generated image and is used for representing a difference between the first generated image in the second modality and the first modality image. The modality restoration effect is used for indicating a restoration effect of a first restored image obtained by restoring based on the first generated image and is used for indicating a difference between the first restored image in the first modality and the first modality image.

The constraint loss value is used for indicating a corresponding mapping loss in a case that the first candidate network maps the first modality image to the three-dimensional image space.

Illustratively, the mapping loss refers to loss values corresponding to different types of features generated in the process of outputting the first generated image after the first candidate network maps image feature representation corresponding to the first modality image to the three-dimensional image space.

Alternatively, the constraint loss value includes at least one of the following types.

1. A dimension conversion loss, namely, a corresponding loss value when performing dimension conversion on the first modality image in the three-dimensional image space.
2. A domain constraint loss, namely, in the process of performing modality conversion on the first modality image through the first candidate network, there is a corresponding feature loss existing in the obtained first generated image corresponding to the first modality image.
3. A texture constraint loss, namely, a corresponding region segmentation loss in process of performing modality conversion on the first modality image to generate the first generated image.
4. A contour constraint loss, namely, a corresponding image contour boundary loss in the process of performing modality conversion on the first modality image to generate the first generated image.

The above-mentioned constraint loss values are merely illustrative examples, and embodiments of this application do not limit this.

Alternatively, manners of obtaining the constraint loss value include at least one of the following several manners.

1. The difference between the first generated image and the first modality image is obtained to determine the constraint loss value.
2. Image features corresponding to the first generated image and the first modality image are obtained, and the image features are fused to determine the constraint loss value.

3. Image features corresponding to the first generated image and the first modality image are obtained, and a distance between the two image features is determined to determine the constraint loss value.
4. Image features corresponding to the first generated image and the first modality image are obtained, and the image features are spliced to determine the constraint loss value.
5. A constraint loss model is constructed, and image features corresponding to the first generated image and the first modality image are obtained; the image features are inputted into the constraint loss model, and an outputted result is taken as the constraint loss value.

The above-mentioned manners of obtaining the constraint loss value are merely illustrative examples, and embodiments of this application do not limit this.

Step 305: Train the first candidate network based on the constraint loss value to obtain an image conversion network.

The image conversion network is used for performing modality conversion on an image belonging to the first modality to obtain a three-dimensional image belonging to the second modality.

Alternatively, the first candidate network is gradient trained with the constraint loss value, or the first candidate network is iteratively trained with the constraint loss value, which is not limited thereto.

Illustratively, the image conversion network is used for performing modality conversion on an image belonging to the first modality in the three-dimensional image space to obtain a three-dimensional image belonging to the second modality.

Alternatively, the image of the first modality is the two-dimensional image, or the image of the first modality is the three-dimensional image, which is not limited thereto.

Alternatively, the image conversion network performs modality conversion in a same or different manner as the first candidate network performing the modality conversion described above, which is not limited thereto.

In summary, in the image generation method provided by embodiments of this application, the modality conversion and modality restoration are performed on the first modality image through the first candidate network and the second candidate network to obtain the first generated image and the first restored image. The first candidate network is used for converting the first modality image into the three-dimensional image of the second modality. A corresponding constraint loss value of the first candidate network in the three-dimensional image space is determined according to the first generated image and the first restored image so that the manner for training the first candidate network can make the effect of the three-dimensional image generated by the final trained image conversion network better; that is, the training effect of the image conversion network can be improved by introducing the three-dimensional image space in the first candidate network, thereby making the outputted three-dimensional image more accurate.

Figure 4:
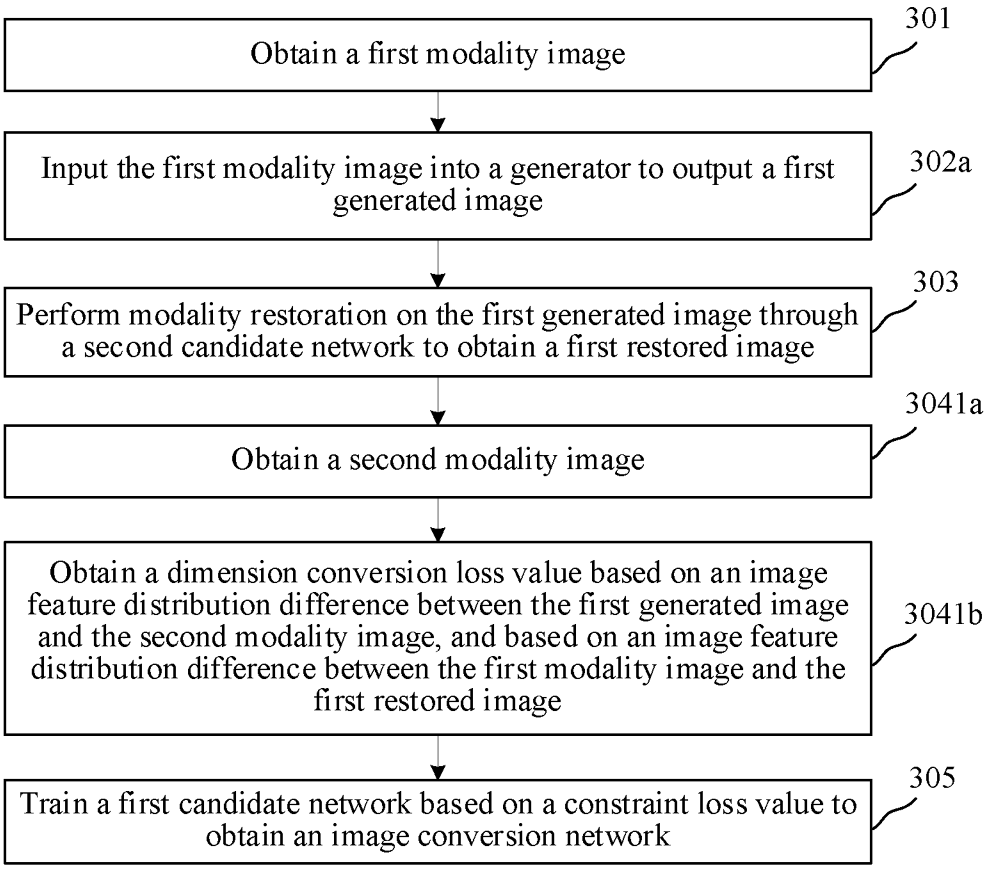
FIG. 4 is a flowchart of an image generation method provided by another exemplary embodiment of this application.

In an alternative embodiment, the constraint loss value includes the dimension conversion loss. FIG. 4 illustrates a flowchart of an image generation method provided by an exemplary embodiment of this application. The method may be performed by the terminal, may be performed by the server, or may also be performed by both the terminal and the server, and in some embodiments, the method being performed by the server is taken as an example to describe. As shown in FIG. 3, namely, step 302 includes 302*a*, step 304 further includes step 3041*a* and step 3041*b*, and the method includes the following steps.

Step 302*a*: Input the first modality image into a generator to output the first generated image.

Illustratively, the first candidate network adopts a generator in a generative adversarial network architecture, and the first modality image is inputted into the generator to output the first generated image.

The generator adopts a corresponding generative model in the GAN network, and the first modality image is inputted into the generator. The generator synthesizes the first modality image by adding a noise randomly to output the first generated image belonging to the second modality.

In some embodiments, the generator obtains a generated feature representation corresponding to an image feature representation of the first modality image in the three-dimensional image space by mapping the image feature representation corresponding to the first modality image to the three-dimensional image space and determines the first generated image according to the generated feature representation.

In some embodiments, the generator contained in the first candidate network includes three convolution layers with steps of 1, 2, and 2, respectively, as a front-end, six residual blocks, two step-wise convolutions with step of ½, and one back-end convolution layer with step of 1. Convolution-Batch Norm-ReLU is applied everywhere except for an output layer, which is finally activated using Tanh. Each residual block includes two convolution layers, and each convolution layer has 128 filters. A volume convolution kernel of 7×7 is adopted for the first and last layer, and 3×3×3 is used for the other layers.

In some embodiments, the generator contained in the first candidate network is denoted as a generator G.

Step 303: Perform modality restoration on the first generated image through a second candidate network to obtain a first restored image.

The first restored image corresponds to the first modality.

In some embodiments, the second candidate network corresponds to the first candidate network as a network of the same architecture, namely, a generator in the second candidate network also adopts a corresponding generative model in the GAN network. The generator contained in the first candidate network and the generator contained in the second candidate network are respective corresponding generators in the two candidate networks, and in some embodiments, the generator contained in the second candidate network is denoted as a generator F.

Illustratively, a structure of the generator F in the second candidate network is the same as a structure of the generator G and will not be described again herein.

Step 3041*a*: Obtain a second modality image.

The second modality image is a pre-provided image of the second modality.

Illustratively, the second modality image is an image corresponding to the second modality.

Illustratively, the second modality image is the sample training image in the public training dataset, which is not limited thereto.

Alternatively, obtaining the first modality image includes obtaining from a locally stored image dataset, or downloading from an existing training dataset, which is not limited thereto.

Alternatively, the second modality image and the first modality image have a corresponding relationship, namely, the first modality image and the second modality image are an image sample group that is matched in advance; or the second modality image and the first modality image do not have the corresponding relationship, namely, the first modality image and the second modality image are sample images randomly obtained as training, which is not limited thereto.

In some embodiments, the first modality image is first inputted into the generator G to generate the first generated image, and then the first generated image is inputted into the generator F to generate the first restored image, thereby realizing a training process from the generator G to the generator F, namely, a process from the first candidate network to the second candidate network. However, in order to improve the generalization performance of the model, in another feasible embodiment, the second modality image is first inputted into the generator F to generate a second generated image, and then the second generated image is inputted into the generator G to generate a second restored image. A corresponding constraint loss value is determined based on the second generated image and the second restored image to train the second candidate network, namely, a training process from the second candidate network to the first candidate network is realized.

In the image generation method provided by this application, both the process from the first candidate network to the second candidate network and the training process from the second candidate network to the first candidate network are included, that is, the generator G and the generator F are bidirectional mapping functions constructed in the three-dimensional image space for performing modality conversion between the first modality image and the second modality image. Since the training processes are identical on both sides and only training directions are different, the training process from the first candidate network to the second candidate network is specifically described in the embodiments as an example.

Step 3041*b*: Obtain a dimension conversion loss value based on an image feature distribution difference between the first generated image and the second modality image, and based on an image feature distribution difference between the first modality image and the first restored image.

The dimension conversion loss value is used for indicating a feature loss during a dimension conversion process of the first candidate network in the three-dimensional image space. The image feature distribution difference is used for indicating a distribution difference of image features corresponding to different images in a vector space.

Illustratively, the dimension conversion loss value is used for determining a corresponding feature loss during the dimension conversion process in the three-dimensional image space in the process of performing modality conversion from the first modality image to generate the first generated image. The dimension conversion includes: converting the two-dimensional image into the three-dimensional image, or converting the three-dimensional image into the three-dimensional image, but corresponding to a different image feature distribution, which is not limited thereto.

With the help of the pre-obtained second modality image of the second modality, a reference basis may be provided for the second modality corresponding to the first generated image. A difference situation between the first generated image obtained by modality conversion and the second modality image originally belonging to the second modality can be determined by the image feature distribution difference between the first generated image and the second modality image, and then a modality conversion situation of the first generated image is more clearly known.

Similarly, a difference situation between the first modality image originally belonging to the first modality and the first restored image obtained after the modality restoration can be determined through the image feature distribution difference between the first modality image and the first restored image, and then a modality restoration situation of the first restored image is more clearly known. Therefore, the dimension conversion loss value is a loss value obtained by considering both the modality conversion situation and the modality restoration situation, which has more comprehensive characteristics and is beneficial to a more thorough training of the first candidate network.

In some embodiments, a discrimination loss is determined based on the image feature distribution difference between the second modality image and the first generated image; a generation loss is determined based on the image feature distribution difference between the first modality image and the first restored image; the generation loss and the discrimination loss are taken as the dimension conversion loss value, and the dimension conversion loss value is used for indicating the loss generated in a case that the first candidate network performs image dimension conversion through the three-dimensional image space.

Illustratively, the dimension conversion loss value includes two parts: the discrimination loss and the generation loss, where the discrimination loss is determined according to the second modality image and the first generated image, and the generation loss is determined from the first modality image and the first restored image.

The above describes the discrimination loss and the generation loss that constitute the dimension conversion loss value. With the help of the image feature distribution difference between the second modality image originally belonging to the second modality and the first generated image obtained by modality conversion, the discrimination loss in the process of modality conversion is obtained. With the help of the image feature distribution difference between the first modality image originally belonging to the first modality and the first restored image obtained after the modality restoration, the generation loss in the process of modality restoration is obtained so that the discrimination loss corresponding to the modality conversion and the generation loss corresponding to the modality restoration can be integrated to perform a subsequent more comprehensive training process on the first candidate network.

In some embodiments, the first candidate network further includes a discriminator in the generative adversarial network architecture, which is configured to determine the image feature distribution difference between the second modality image and the first generated image, and determine the discrimination loss according to the difference between the second modality image and the first generated image, namely, the second modality image is inputted into the discriminator to output a reference prediction result, the reference prediction result being used for indicating a probability of the second modality image as a reference image; the first generated image is inputted into the discriminator to output a matching prediction result, the matching prediction result being used for indicating the matching relationship corresponding to the first generated image and the second modality image; the discrimination loss is determined based on the reference prediction result and the matching prediction result.

The discriminator is a corresponding discriminative model in the GAN network, and the first generated image and the second modality image are inputted into the discriminative model. An output of the discriminative model is a probability value, and the probability value is distributed between 0 and 1, 1 representing a real sample, namely, the second modality image, and 0 being a fictional sample, namely, the first generated image. The probability value is used for determining a similarity between the first generated image and the second modality image. When the first generated image is closer to the second modality image, the larger an outputted probability value is, indicating that the accuracy of the generator generating the image is higher.

In some embodiments, the discriminator is configured to determine a difference between the first generated image of the second modality and the second modality image, that is, the second modality image is taken as the reference image to be inputted into the discriminator to output the reference prediction result corresponding to the second modality image. At this time, the current discriminator takes the second modality image as the reference image, and after the first generated image is inputted into the discriminator, an outputted matching prediction probability is taken as a matching result corresponding to the current first generated image and the second modality image, such as an image feature distribution probability corresponding to the first generated image is displayed on the second modality image, and the image feature distribution probability is used for indicating a matching result of the image feature corresponding to the first generated image on the second modality image.

The above-mentioned manner for calculating the discrimination loss is the discrimination loss corresponding to the training process from the first candidate network to the second candidate network, and in the training process from the second candidate network to the first candidate network, the discriminator is also included in the second candidate network, and therefore there is also the discrimination loss in this training process.

The discrimination loss is determined according to the reference prediction result and the matching prediction result. Illustratively, please refer to Equation 1:

$$L_b(D_G,D_F,G,F)=L(G,D_G)+L(F,D_F) \quad \text{Equation 1:}$$

$L_b$ is a total discrimination loss, $L(G,DG_G)$ is a discrimination loss corresponding to the discriminator in the first candidate network, and $L(F,D_F)$ is a diacrimination loss corresponding to the discriminator in the second candidate network. In practical application, the total discrimination loss is adopted. The higher the image feature distribution probability of the first generated image corresponding to the second modality image, the higher the authenticity performance of the current first generated image fitting to the second modality image, namely, the smaller the discrimination loss value.

In some embodiments, the discriminator in the first candidate network is denoted as $D_G$. In the process of constructing the discriminator $D_G$, a block size is fixed in an overlapping manner as a 70×70×70 volume pixel, and the discriminator $D_G$ is trained using a stack of a Convolution-BatchNorm-Leaky ReLU layer. The discriminator $D_G$ performs a convolution operation over the entire volume pixel and determines a corresponding prediction result by averaging all the results.

The above describes the process of determining the discrimination loss with the help of the discriminator in the first candidate network. First, the second modality image is inputted into the discriminator, and the reference prediction result of taking the second modality image as the reference image is determined. Then, the second modality image is taken as the reference image, and the matching prediction result is obtained based on the matching relationship between the second modality image and the first generated image. Finally, based on the reference prediction result and the matching prediction result, relevant factors in the process of obtaining the discrimination loss are considered in many aspects from the perspective of being able to take the second modality image as the reference image and the result obtained after matching, and the accuracy of obtaining the discrimination loss is improved.

In some embodiments, a first feature representation corresponding to the first modality image is determined; a second feature representation corresponding to the first restored image is determined; the generation loss is determined based on a feature representation distance between the first feature representation and the second feature representation.

In some embodiments, in a case where the first modality image corresponds to the first modality, the image feature representation corresponding thereto is taken as the first feature representation, and in a case where the first restored image corresponds to the first modality, an image generation representation corresponding thereto is taken as the second feature representation.

In some embodiments, the generation loss is determined according to the first feature representation and the feature representation distance corresponding to the first feature representation. Illustratively, please refer to Equation 2.

$$\mathcal{L}_C(X,G,Y,F)=E_{X\sim P_{data}(X)}\|X-F(G(X))\|_1+E_{Y\sim P_{data}(Y)}\|Y-G(F(Y))\|_1 \quad \text{Equation 2:}$$

X is the first modality image, F(G(X)) is the first restored image, Y is the second modality image, G(F(Y)) is the second restored image obtained in the training process from the second candidate network to the first candidate network (the obtaining process of the second restored image is the same as the obtaining process of the first restored image, and therefore not described in detail herein), $\mathcal{L}_C(X,G,Y,F)$ is a total generation loss, $E_{X\sim P_{data}(X)}=\|X-F(G(X))\|$ represents the feature representation distance corresponding to the first modality image and the first restored image, and obtaining the generation loss corresponding to the generator G, that is, the generation loss being a generation loss corresponding to the training process from the first candidate network to the second candidate network, and $E_{Y\sim P_{data}(Y)}\|Y-G(F(Y))\|$ is the generation loss corresponding to the generator F, that is, the generation loss is a generation loss generated during the training process from the second candidate network to the first candidate network. In practical application, the total generation loss is adopted for training. In the training process from the first candidate network to the second candidate network, the smaller X−F(G(X)), the smaller a distance between the feature distributions of the current first modality image and the first restored image, i.e., the smaller the generation loss. The training process from the second candidate network to the first candidate network is consistent therewith, which will not be described in detail herein.

The above describes the obtaining process of the generation loss. When determining the generation loss between the first modality image and the first restored image, the generation loss is determined by the distance in the vector space of the first feature representation corresponding to the first modality image and the second feature representation corresponding to the first restored image so that the generation loss can be obtained more intuitively with the help of the distribution density, degree of dispersion, etc. between the feature representations.

In addition, the first generated image can be obtained more quickly with the help of the generator included in the candidate network in advance, and, as a component structure in the candidate network, the generator participates in model training while generating the first generated image, facilitating the subsequent generation of the first generated image which is closer to the second modality image, and improving the accuracy of the generated image.

In some embodiments, the total generation loss and the total discrimination loss are taken as two losses corresponding to the dimension conversion loss value to determine the losses corresponding to the bidirectional mapping function corresponding to the first candidate network and the second candidate network to perform dimension conversion in the three-dimensional image space.

In summary, in the image generation method provided by embodiments of this application, the modality conversion and modality restoration are performed on the first modality image through the first candidate network and the second candidate network to obtain the first generated image and the first restored image. The first candidate network is used for converting the first modality image into the three-dimensional image of the second modality. A corresponding constraint loss value of the first candidate network in the three-dimensional image space is determined according to the first generated image and the first restored image so that the manner for training the first candidate network can make the effect of the three-dimensional image generated by the final trained image conversion network better; that is, the training effect of the image conversion network can be improved by introducing the three-dimensional image space in the first candidate network, thereby making the outputted three-dimensional image more accurate.

In embodiments of this application, by determining the generation loss corresponding to the generator and the discrimination loss corresponding to the discriminator as the dimension conversion loss, it is possible to improve the conversion accuracy of the first candidate network in the process of performing feature mapping on the first modality image in the three-dimensional image space and thus realizing the dimension conversion, and a loss corresponding to the dimension conversion can be better reduced to improve the model accuracy.

Figure 5:
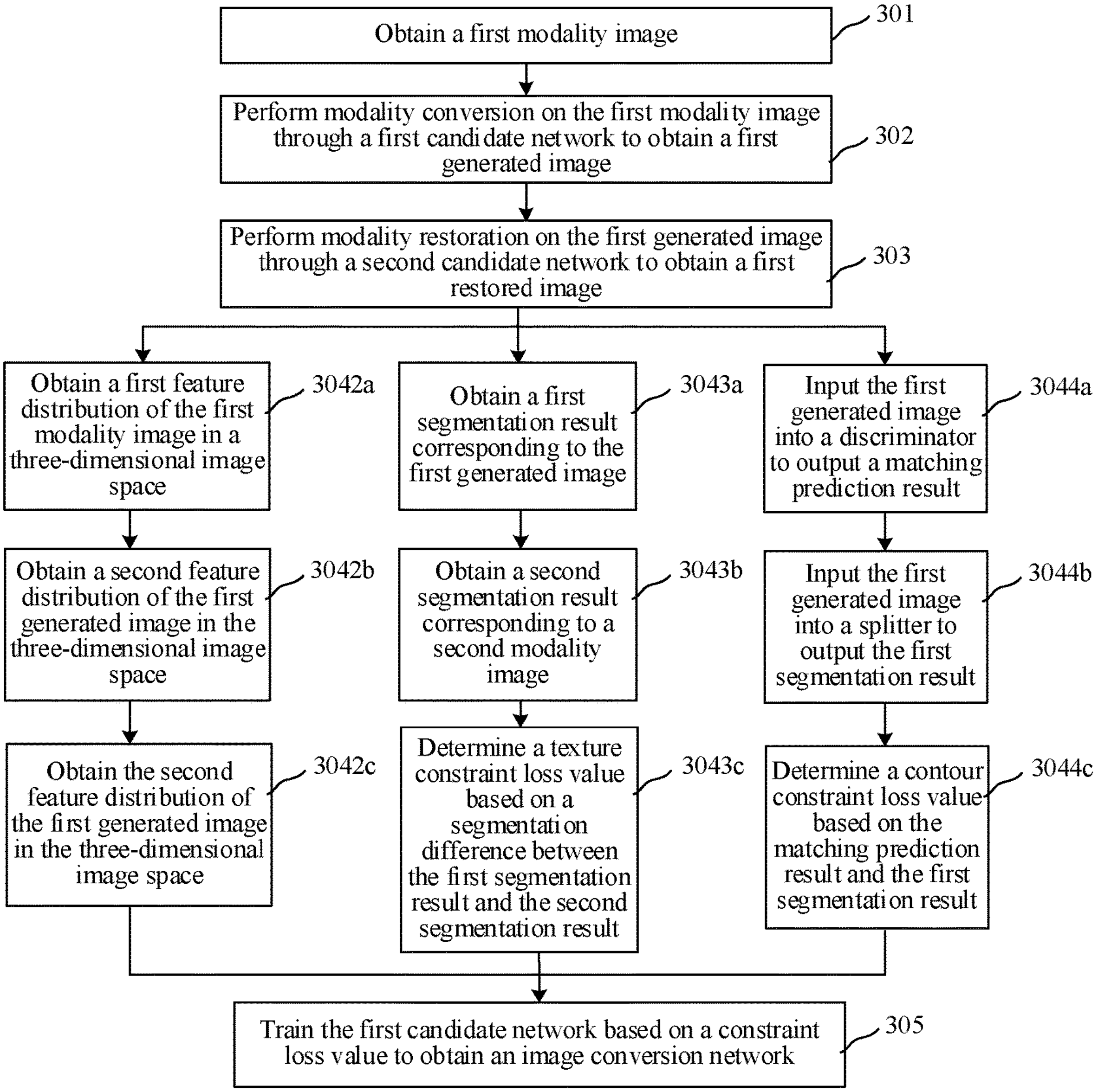
FIG. 5 is a flowchart of an image generation method provided by another exemplary embodiment of this application.

In an alternative embodiment, the constraint loss value further includes a domain constraint loss value, a texture constraint loss value, and a contour constraint loss value. FIG. 5 illustrates a flowchart of an image generation method provided by an exemplary embodiment of this application. The method may be performed by the terminal, may be performed by the server, or may also be performed by both the terminal and the server, and in some embodiments, the method being performed by the server is taken as an example to describe. As shown in FIG. 5, namely, when the constraint loss value includes the domain constraint loss value, step 304 further includes step 3042*a*, step 3042*b*, and step 3042*c*; when the constraint loss value includes the texture constraint loss value, step 304 further includes step 3043*a*, step 3043*b*, and step 3043*c*; when the constraint loss value includes the contour constraint loss value, step 304 further includes step 3044*a*, step 3044*b*, and step 3044*c*. The method includes the following steps.

1. The Constraint Loss Value Includes the Domain Constraint Loss Value.

Step 3042*a*: Obtain a first feature distribution of the first modality image in the three-dimensional image space.

In some embodiments, in the process of inputting the first modality image into the generator to obtain the first generated image of the second modality, it is generally assumed that the feature distributions of the two image modalities are invariant in their corresponding image domains, but the actual situation is that when a cross-modality conversion is performed on the image, the feature distribution thereof changes in the image domain, especially in the process of collecting a multi-sequence medical image. A medical image sequence is used for indicating different modes for describing a disease or a disease condition; In order to improve the generalization performance of a model and reduce the influence caused by the difference between the respective image domains between the modalities in the process of the cross-modality conversion, the domain constraint loss is introduced.

In some embodiments, in the process of inputting the first modality image into the first candidate network, the first modality image is mapped to the three-dimensional image space for extracting the image feature distribution corresponding to the first modality image as the first feature distribution for representing a feature distribution result corresponding to the first modality.

Step 3042*b*: Obtain a second feature distribution of the first generated image in the three-dimensional image space.

Illustratively, the first generated image is mapped to the three-dimensional image space for determining the image feature distribution corresponding to the first generated image.

Step 3042*c*: Obtain the domain constraint loss value based on a distance between the first feature distribution and the second feature distribution.

The domain constraint loss value is used for indicating a conversion loss from the first feature distribution to the second feature distribution in the three-dimensional image space.

Illustratively, the domain constraint loss value is used for determining a corresponding feature similarity of the first feature distribution and the second feature distribution in the three-dimensional image space, namely, a corresponding similar feature in the current first modality and the second modality.

In some embodiments, the domain constraint loss value is determined by a maximum mean discrepancy (MMD). Illustratively, Equation 3 shows a specific determination manner.

$$\mathcal{L}(X, Y) \triangleq \|E_X[\Phi(X)] - E_Y[\Phi(Y)]\|_{\mathcal{H}}^2 \quad \text{Equation 3}$$

$E_X[\Phi(X)]$ corresponds to the first feature distribution of the first modality, and $E_Y[\Phi(Y)]$ represents the second distribution feature corresponding to the second modality. When a difference between the first distribution feature and the second distribution feature is smaller, it indicates that a feature distance between the first distribution feature and the second distribution feature is shorter, and a current similarity between the first distribution feature and the second distribution feature is higher.

The above introduces the domain constraint loss value among the constraint loss value. The domain constraint loss value is determined by the distance in the three-dimensional image space between the first feature representation of the first modality image and the second feature representation of the first generated image so that the domain constraint loss value of the first candidate network in the process of converting the first modality image into the first generated image can be determined more intuitively with the help of a distribution situation between the feature representations.

2. The Constraint Loss Value Includes the Texture Constraint Loss Value.

Step 3043*a*: Obtain a first segmentation result corresponding to the first generated image.

The first segmentation result is used for indicating a reference probability distribution of the first generated image corresponding to the first modality image.

In some embodiments, the first generated image is inputted into a splitter to output the first segmentation result, and the splitter is configured to perform region segmentation on an input image.

Illustratively, the first candidate network further includes the splitter configured to perform the region segmentation on the input image for determining a corresponding texture representation between regions corresponding to the input image.

In some embodiments, the first generated image is inputted into the splitter to output the first segmentation result for determining a texture feature corresponding to the first generated image.

Illustratively, a full convolution network (FCN) is adopted as the splitter in the implementation.

Step 3043*b*: Obtain a second segmentation result corresponding to the second modality image.

Illustratively, the second modality image is inputted into the splitter to output the second segmentation result, and the second segmentation result is used for representing a texture feature corresponding to the second modality image.

Step 3043*c*: Determine the texture constraint loss value based on a segmentation difference between the first segmentation result and the second segmentation result.

The texture constraint loss value is used for indicating a texture feature loss when the first candidate network maps the first modality image to the three-dimensional image space.

Illustratively, in order to determine context information corresponding to the first generated image, it needs to be determined that the texture representation contained in the second modality image may be correctly embodied in the first generated image, for example: when the second modality image is a brain image, brain texture information corresponding to the brain image is an important factor for generating a corresponding three-dimensional brain image because the brain texture information and information such as disease progression and functional change are key factors for brain pathological analysis. Therefore, the texture constraint loss value is introduced for determining a loss value corresponding to the texture feature in the three-dimensional image space in the process of inputting the first modality image into the first candidate network to generate the first generated image.

In some embodiments, a two-stage texture loss function is preset for reserving the texture feature corresponding to the process of the first modality image generating the first generated image through the first candidate network. Illustratively, please refer to Equation 4:

$$\mathcal{L}_L(G,F)=E_{X\sim Pdala(X)}\|\varkappa_l(G(X))-\varkappa_l(X)\|_1+E_{Y\sim Pdala(Y)}\|\varkappa_l(F(y))-\varkappa_l(Y)\|_1 \quad \text{Equation 4:}$$

$\mathcal{L}_L(G,F)$ represents a total texture constraint loss value, $E_{X\sim Pdala}\|\varkappa_l(G(X))-\varkappa_l(X)\|$ represents a corresponding texture constraint loss value in the training process from the first candidate network to the second candidate network, namely, a segmentation difference between the first segmentation result and the second segmentation result, $E_{Y\sim Pdala}\|\varkappa_l(F(Y))-\varkappa_l(Y)\|$ represents a corresponding texture constraint loss value in the training process from the second candidate network to the first candidate network. Taking the training process from the first candidate network to the second candidate network as an example, $\varkappa_l(G(X))$ represents the first segmentation result corresponding to the first generated image, and $\varkappa_l(X)$ represents the second segmentation result corresponding to the second modality image. When the difference between the first segmentation result and the second segmentation result is smaller, it shows that the higher the similarity of texture features corresponding to the first generated image and the second modality image, the smaller the texture constraint loss value.

The above introduces the texture constraint loss value among the constraint loss value. Based on that the first modality image is the image corresponding to the first modality, the first segmentation result corresponding to the first generated image can be determined through a reference probability distribution of the first generated image corresponding to the first modality image so that based on the first segmentation result and the second segmentation result corresponding to the first modality image, it is possible to more intuitively determine a change situation caused by the image texture in the process of performing modality conversion on the first modality image into the first generated image, facilitating a directed and comprehensive training process on the first candidate network from the texture constraint loss value corresponding to the change of the image texture.

3. The Constraint Loss Value Includes the Contour Constraint Loss Value.

Step 3044*a*: Input the first generated image into the discriminator to output the matching prediction result.

The matching prediction result is used for indicating the matching relationship corresponding to the first generated image and the second modality image.

The content of the matching prediction result in the step 3044*a* is described in detail in the above-mentioned step 3041*b* and will not be described again herein.

Step 3044*b*: Input the first generated image into a splitter to output the first segmentation result.

The splitter is configured to perform region segmentation on the input image.

The image segmentation is performed on the first generated image with the help of the pre-obtained splitter, which is beneficial to train the splitter in the subsequent process with the help of the first segmentation result obtained by predicting. The model is trained more precisely in a structured manner, which is beneficial to improve the robustness of the model after training.

The content of the first segmentation result in the step 3044*b* is described in detail in the above-mentioned step 3043*a* and will not be described again herein.

Step 3044*c*: Determine the contour constraint loss value based on the matching prediction result and the first segmentation result.

The contour constraint loss value is used for indicating a boundary feature loss corresponding to the first generated image in the three-dimensional image space.

In some embodiments, contour information of the image may be used for image analysis and semantic segmentation on the image, and the contour information is used for providing semantic information and a context relationship corresponding to the image, such as when the first modality image is the brain image, contour information corresponding to the brain image facilitates a better understanding of an anatomical structure corresponding to the brain and promotes disease progression. In a process of generating a corresponding brain MRI image of the second modality from the brain image of the first modality, ensuring that a contour of the brain image of the first modality maintains a clear boundary in the process of cross-modality is the key to realizing that the brain MRI image has a better contour boundary display. Therefore, the contour constraint loss value is introduced for determining the boundary feature loss of the first generated image corresponding to the first modality image in the three-dimensional image space.

In some embodiments, in the training process from the first candidate network to the second candidate network, the first generated image is inputted into the discriminator and the splitter corresponding to the first candidate network. However, in the training process from the second candidate network to the first candidate network, the second generated image is inputted into the discriminator and the splitter corresponding to the second candidate network for determining the contour constraint loss value. The splitter in the first candidate network and the splitter in the second candidate network are implemented as a deconvolution operation, following the FCN network.

The above introduces the contour constraint loss value among the constraint loss value. The first generated image is inputted into the discriminator, and the matching prediction result is determined based on the matching relationship corresponding to the first generated image and the second modality image. The first generated image is inputted into the splitter to output the first segmentation result for performing region segmentation on the input image, thereby combining the matching prediction result and the first segmentation result to determine the contour constraint loss value representing the boundary feature loss of the first generated image in the three-dimensional image space, which is beneficial to tend to limit a generation range of the first generated image within an image range corresponding to the first modality image as much as possible in the training process. It is beneficial to perform a directed and comprehensive training process on the first candidate network from a contour constraint loss value corresponding to an image contour angle, thereby improving the generation accuracy of the first generated image from the boundary perspective.

Step 305: Train the first candidate network based on the constraint loss value to obtain an image conversion network.

Illustratively, the four constraint loss values provided by embodiments of this application may be coordinated differently according to different task scenes to adjust model parameters of the first candidate network.

In summary, in the image generation method provided by embodiments of this application, the modality conversion and modality restoration are performed on the first modality image through the first candidate network and the second candidate network to obtain the first generated image and the first restored image. The first candidate network is used for converting the first modality image into the three-dimensional image of the second modality. A corresponding constraint loss value of the first candidate network in the three-dimensional image space is determined according to the first generated image and the first restored image so that the manner for training the first candidate network can make the effect of the three-dimensional image generated by the final trained image conversion network better; that is, the training effect of the image conversion network can be improved by introducing the three-dimensional image space in the first candidate network, thereby making the outputted three-dimensional image more accurate.

In some embodiments, by setting the domain constraint loss value, the texture constraint loss value, and the contour constraint loss value, the image conversion network may satisfy image generation tasks under different task scenes for improving the model accuracy and generalization performance of the image conversion network.

Figure 6:
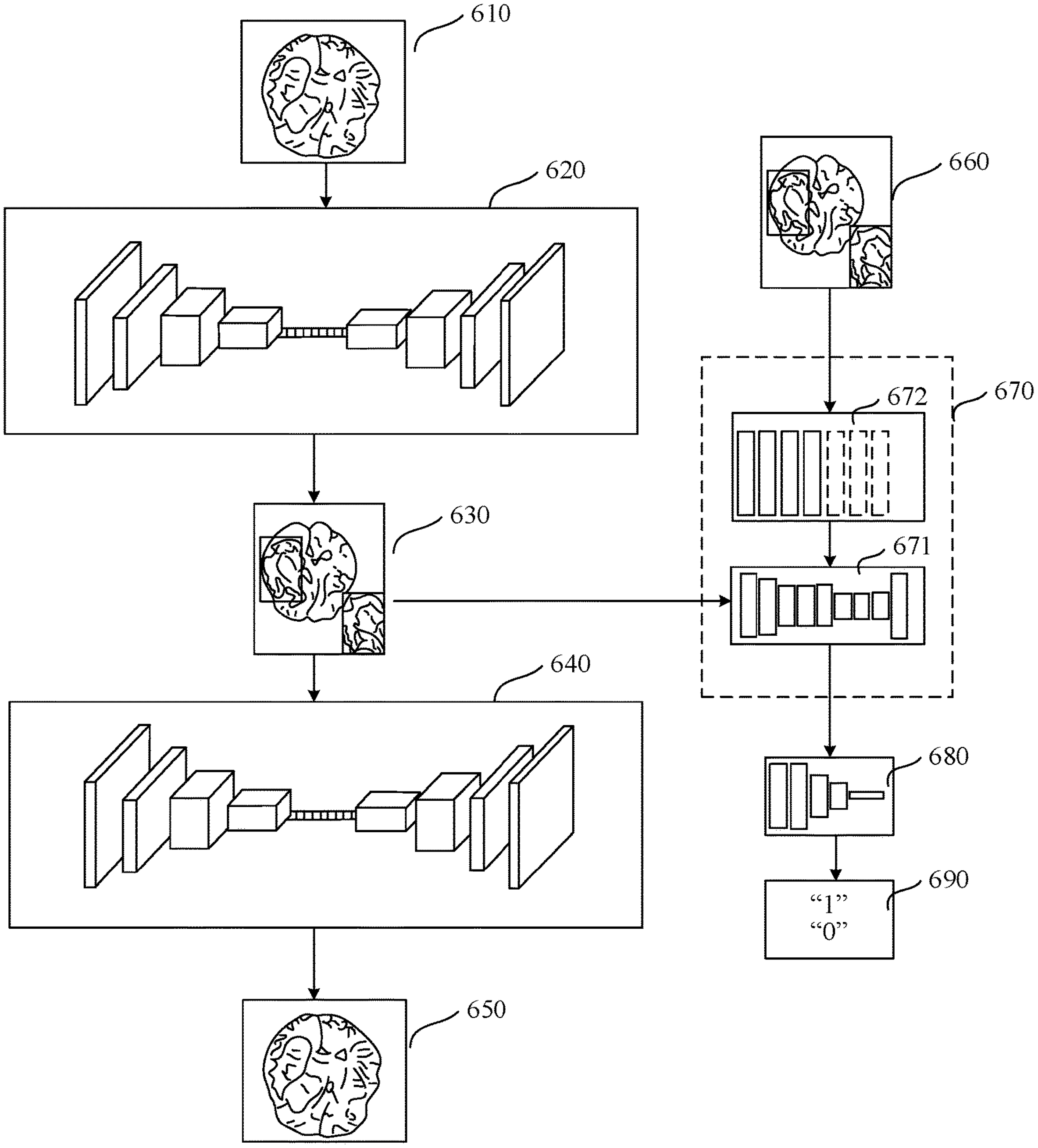
FIG. 6 is a schematic diagram of an image generation method provided by an exemplary embodiment of this application.

In an alternative embodiment, FIG. 6 illustrates a schematic diagram of a training process of an image generation method provided by an exemplary embodiment of this application. As shown in FIG. 6, the method includes the following steps.

A first modality image 610 is obtained, where the first modality image 610 is the brain image of the first modality obtained from the public dataset. The first modality image is inputted into a generator (G) 620 in the first candidate network to generate a first generated image 630, where the first generated image 630 is the three-dimensional brain image of the second modality. The first generated image 630 is inputted into a generator (F) 640 in the second candidate network to output a first restored image 650, where the first restored image 650 corresponds to the brain image of the first modality. The first modality and the second modality correspond to different modalities.

In the process of model training, a second modality image 660 is also included, and the second modality image 660 is the brain image of the second modality obtained from the public dataset. Four different constraint loss values are determined according to an image feature distribution difference between the first generated image 630 and the second modality image 660 and an image feature distribution difference between the first modality image 610 and the first restored image 650, including the dimension conversion loss value, the domain constraint loss value, the texture constraint loss value, and the contour constraint loss value.

In addition, the first candidate network further includes a splitter 670 and a discriminator 680, where the first generated image 630 is inputted into the splitter 670 to output a first segmentation result 671, and the second modality image 660 is inputted into the splitter 670 to output a second segmentation result 672. The first generated image 630 and the second modality image 660 are inputted into the discriminator 680 to output a matching prediction result 690. In the matching prediction result 690, an output value of "1" indicates that the current first generated image 630 and the second modality image 660 match, and an output value of "0" indicates that the current first generated image 630 and the second modality image 660 do not match.

During training, a generation loss is determined according to the first modality image 610 and the first restored image 650, a confrontation loss is determined according to the first generated image 630 and the second modality image 660, and the generation loss and the confrontation loss are taken as the dimension conversion loss.

The domain constraint loss value is determined according to a first feature distribution corresponding to the first modality image 610 and a second feature distribution corresponding to the first generated image 630.

The texture constraint loss value is determined based on the first segmentation result and the second segmentation result.

The contour constraint loss value is determined based on the matching prediction result and the first segmentation result.

According to four different constraint loss values, at least one current task scene is selected to train the first candidate network, and finally, the image conversion network is obtained for generating the three-dimensional brain image.

Figure 7:
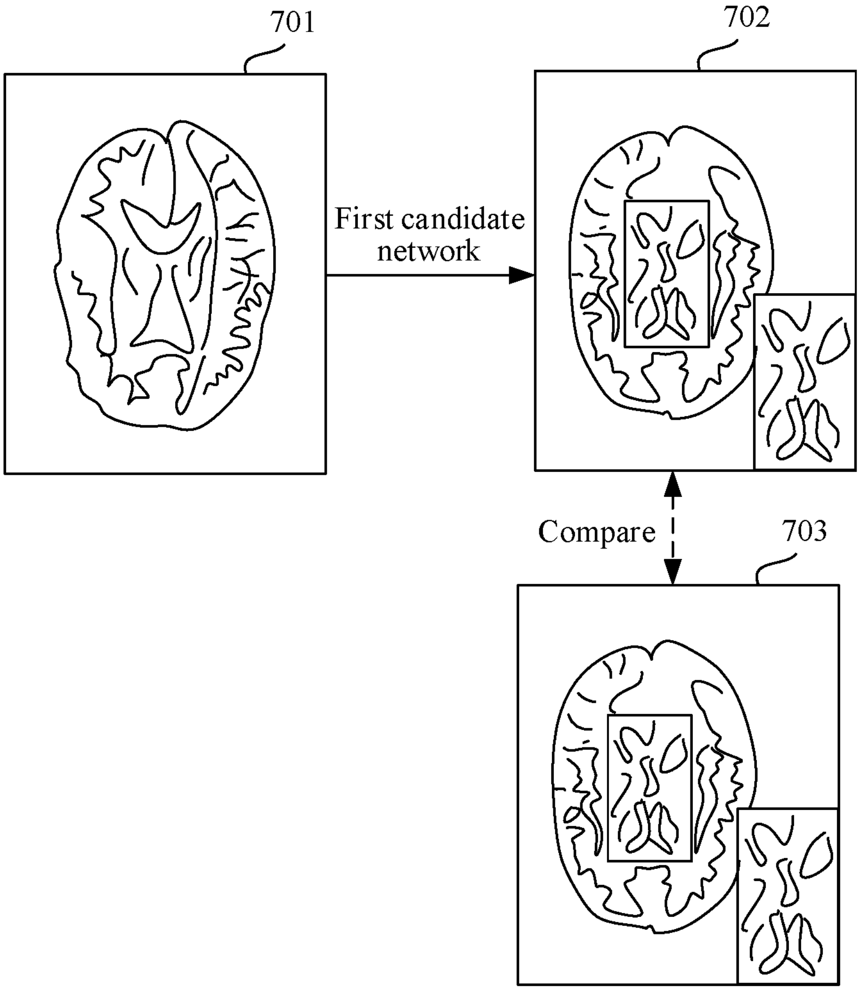
FIG. 7 is a schematic diagram of a brain image generation process provided by an exemplary embodiment of this application.

The image generation method is evaluated on three datasets: a first public dataset, a second public dataset, and a third public dataset. These three datasets contain four sequences of brain images: a T1 weighted image, a T2 weighted image, a proton density (PD) weighted image, and an MRI fluid attenuated inversion recovery (FLAIR) image. The four sequences correspond to different modalities, and the four sequence images show different brain features. The image generation method is evaluated in three scenes, these scenes are selected according to the complexity of matching the image domain corresponding to the first modality and the image domain corresponding to the second modality: (1) a task corresponding to the first public dataset being: converting the PD weighted image into the T2 weighted image; (2) a task corresponding to the second public dataset being: converting the T1 weighted image into the T2 weighted image; and (3) a task corresponding to the third public dataset being: converting the FLAIR image into the T1 weighted image. In scene (1), FIG. 7 illustrates a schematic diagram of a brain image generation process provided by an exemplary embodiment of this application. As shown in FIG. 7, a PD weighted image 701 is inputted as the first modality image into the first candidate network to output a T2 weighted synthesis image 702 as the three-dimensional image, and FIG. 7 also includes a T2 weighted image 703 as the second modality image (the image is obtained from the public dataset).

In each dataset, there are well-aligned paired images with significant appearance changes obtained by different imaging manners. All paired data are used as standard images to verify the quality of the synthesis results. Quantitatively, 239 unpaired PD weighted images and T2 weighted images are manually selected from the first public dataset, 8 unpaired T1 weighted images and T2 weighted images, and 90 unpaired Ti weighted images and FLAIR images are selected from the second public dataset for training. Remaining data: 100 images in the first public dataset, 4 images in the second public dataset, and 40 images in the third public dataset are used for testing. For FCN, both true scans and synthetic results are provided to generate three main brain tissue categories: cerebral spinal fluid (CSF), gray matter (GM), and white matter (WM), and an average quantification of brain volume is given. A tissue prior probability template is a preset good brain image segmentation template for verifying a segmentation result corresponding to its model. For an evaluation standard, the results are compared using a peak signal-to-noise ratio (PSNR), a structural similarity index (SSIM), and a dice score (a measure of segmentation overlap, a higher score indicating a higher accuracy of the result).

Table 1 illustrates the model training effect for different collocations of constraint loss values provided by embodiments of this application, as shown in Table 1:

To evaluate the performance of the image generation method, an ablation study is first performed to examine each constraint loss value to evaluate the importance of each component in the image conversion network. Specifically, for converting the PD weighted image into the T2 weighted image on the first public dataset, the dimension conversion loss value, the domain constraint loss value, the texture constraint loss value, and the contour constraint loss value are adopted, and they are freely combined with the GAN network to study the effect quality in terms of images and segmentation performance thereof, and the detailed results are shown in the first part of Table 1.

It can be seen from Table 1 that visual and segmentation results are greatly improved with the help of the dimension conversion loss value, the domain constraint loss value, the texture constraint loss value, and the contour constraint loss value. An appearance score is sensitive to the dimension conversion loss value, the domain constraint loss value, and the texture constraint loss value, while the segmentation result is more sensitive to the domain constraint loss value and the contour constraint loss value.

The analysis shows that the domain constraint loss value and the contour constraint loss value are important to the visual effect and segmentation result. The second part of the results in Table 1 show that the dimension conversion loss value and the domain constraint loss value are the most important pairwise combinations of the four constraints. The third part in Table 1 shows the performance of different combinations of the three constraints. The results show that a combination of the dimension conversion loss value, the domain constraint loss value, and the texture constraint loss value improves the PSNR, SSIM, and dice score by 3.23 dB, 0.0414, and 13.39%, and a further combination of the contour constraint loss value improves the dice score by 14.07%.

In summary, in the image generation method provided by embodiments of this application, the modality conversion and modality restoration are performed on the first modality image through the first candidate network and the second candidate network to obtain the first generated image and the first restored image. The first candidate network is used for converting the first modality image into the three-dimensional image of the second modality. A corresponding constraint loss of the first candidate network in the three-dimensional image space is determined according to the first generated image and the first restored image so that the manner for training the first candidate network can make the

TABLE 1

| GAN Network | Dimension Conversion Loss Value | Domain Constraint Loss Value | Texture Constraint Loss Value | Contour Constraint Loss Value | PSNR (dB) | SSIM | Dice Score |
|---|---|---|---|---|---|---|---|
| ✓ | | | | | 34.03 | 0.9003 | 69.87 |
| ✓ | ✓ | | | | 34.67 | 0.9011 | 77.49 |
| ✓ | | ✓ | | | 35.22 | 0.9015 | 79.43 |
| ✓ | | | ✓ | | 34.78 | 0.9016 | 78.96 |
| ✓ | | | | ✓ | 34.75 | 0.9011 | 80.90 |
| ✓ | ✓ | ✓ | | | 35.59 | 0.9014 | 81.85 |
| ✓ | ✓ | | ✓ | | 35.01 | 0.9076 | 80.42 |
| ✓ | ✓ | | | ✓ | 34.98 | 0.9042 | 81.26 |
| ✓ | | ✓ | ✓ | | 35.57 | 0.9023 | 79.82 |
| ✓ | | ✓ | | ✓ | 35.31 | 0.9019 | 81.29 |
| ✓ | | | ✓ | ✓ | 34.95 | 0.9024 | 80.98 |
| ✓ | ✓ | ✓ | ✓ | | 37.26 | 0.9414 | 83.26 |
| ✓ | ✓ | ✓ | | ✓ | 36.58 | 0.9376 | 83.94 |
| ✓ | | ✓ | ✓ | ✓ | 36.83 | 0.9403 | 83.72 |

effect of the three-dimensional image generated by the final trained image conversion network better; that is, the training effect of the image conversion network can be improved by introducing the three-dimensional image space in the first candidate network, thereby making the outputted three-dimensional image more accurate.

In this scheme, the proposed image generation method can generate a translatable modality representation with rich semantic features, texture details, and anatomical structure preservation. By introducing four constraint loss values, a GAN framework is effectively customized to realize different sequences of brain image synthesis. The present method takes medical image synthesis as the technical background, but in practice, the technology may be applied to other unsupervised synthesis tasks, such as natural image style migration, which is not limited thereto.

Figure 8:
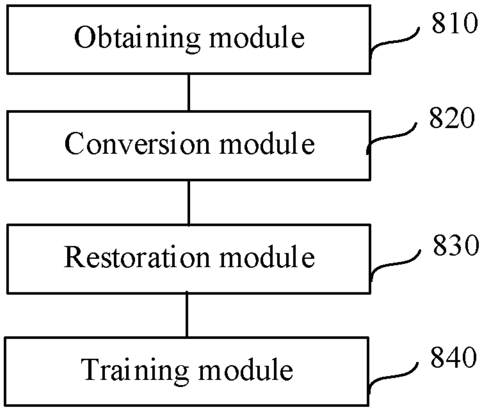
FIG. 8 is a structural block diagram of an image generation apparatus provided by an exemplary embodiment of this application.

FIG. 8 is a structural block diagram of an image generation apparatus provided by an exemplary embodiment of this application. As shown in FIG. 8, the apparatus includes the following parts:

an obtaining module 810, configured to obtain the first modality image, the first modality image corresponding to the first modality;

a conversion module 820, configured to perform modality conversion on the first modality image through the first candidate network to obtain the first generated image, the first candidate network being the network for performing the modality conversion on the first modality image, the first generated image corresponding to the second modality and being the three-dimensional image, and the first modality and the second modality being different modalities;

a restoration module 830, configured to perform modality restoration on the first generated image through the second candidate network to obtain the first restored image, the second candidate network being the network for performing the modality restoration on the first generated image, and the first restored image corresponding to the first modality;

the obtaining module 810 being further configured to obtain the constraint loss value based on the modality conversion effect of the first generated image and the modality restoration effect of the first restored image, the constraint loss value being used for indicating the mapping loss in a case that the first candidate network maps the first modality image to the three-dimensional image space; and a training module 840, configured to train the first candidate network based on the constraint loss value to obtain the image conversion network, the image conversion network being used for performing modality conversion on the image belonging to the first modality to obtain the three-dimensional image belonging to the second modality.

Figure 9:
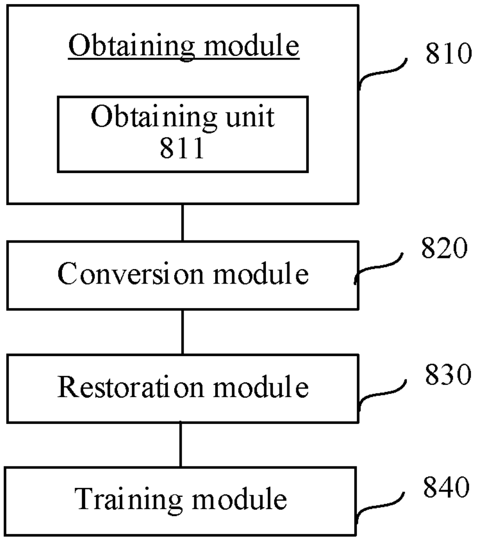
FIG. 9 is a structural block diagram of an image generation apparatus provided by another exemplary embodiment of this application.

In an alternative embodiment, as shown in FIG. 9, the constraint loss value includes the dimension conversion loss value.

The obtaining module 810 includes:

an obtaining unit 811, configured to obtain the second modality image, the second modality image being the pre-provided image of the second modality.

The obtaining unit 811 is further configured to obtain the dimension conversion loss value based on the image feature distribution difference between the first generated image and the second modality image, and based on the image feature distribution difference between the first modality image and the first restored image, the dimension conversion loss value being used for indicating the feature loss generated in a case that the first candidate network performs image dimension conversion through the three-dimensional image space.

In an alternative embodiment, the obtaining unit 811 is further configured to determine the discrimination loss based on the image feature distribution difference between the second modality image and the first generated image; determine the generation loss based on the image feature distribution difference between the first modality image and the first restored image; and take the generation loss and the discrimination loss as the dimension conversion loss value.

In an alternative embodiment, the first candidate network includes a discriminator in a discriminative-generative network architecture.

The obtaining unit 811 is further configured to input the second modality image into the discriminator to output the reference prediction result, the reference prediction result being used for indicating the probability of the second modality image as the reference image; input the first generated image into the discriminator to output the matching prediction result, the matching prediction result being used for indicating the matching relationship corresponding to the first generated image and the second modality image; and determine the discrimination loss based on the reference prediction result and the matching prediction result.

In an alternative embodiment, the obtaining unit 811 is further configured to determine the first feature representation corresponding to the first modality image; determine the second feature representation corresponding to the first restored image; and determine the generation loss based on the feature distance between the first feature representation and the second feature representation.

In an alternative embodiment, the first candidate network includes a generator in the generative adversarial network architecture.

The obtaining unit 811 is further configured to input the first modality image into the generator to output the first generated image.

In an alternative embodiment, the constraint loss value includes the domain constraint loss value.

The obtaining module 810 is further configured to obtain the first feature distribution of the first modality image in the three-dimensional image space; obtain the second feature distribution of the first generated image in the three-dimensional image space; and obtain the domain constraint loss value based on the distance between the first feature distribution and the second feature distribution, the domain constraint loss value being used for indicating the conversion loss from the first feature distribution to the second feature distribution.

In an alternative embodiment, the constraint loss value includes the texture constraint loss value.

The obtaining module 810 is further configured to obtain the first segmentation result corresponding to the first generated image, the first segmentation result being used for indicating the reference probability distribution of the first generated image corresponding to the first modality image; obtain the second segmentation result corresponding to the first modality image, the second segmentation result being used for indicating the texture feature corresponding to the second modality image; and determine the texture constraint loss value based on the segmentation difference between the first segmentation result and the second segmentation result, the texture constraint loss value being used for indicating the texture feature loss in a case that the first candidate network maps the first modality image to the three-dimensional image space.

In an alternative embodiment, the obtaining module 810 is further configured to input the first generated image into the splitter to output the first segmentation result, the splitter being configured to perform region segmentation on the input image.

In an alternative embodiment, the constraint loss value includes the contour constraint loss value.

The obtaining module 810 is further configured to input the first generated image into the discriminator to output the matching prediction result, the matching prediction result being used for indicating the matching relationship corresponding to the first generated image and the second modality image; input the first generated image into the splitter to output the first segmentation result, the splitter being configured to perform region segmentation on the input image; and determine the contour constraint loss value based on the matching prediction result and the first segmentation result, the contour constraint loss value being used for indicating the boundary feature loss corresponding to the first generated image in the three-dimensional image space.

In summary, in the image generation apparatus provided by embodiments of this application, the modality conversion and modality restoration are performed on the first modality image through the first candidate network and the second candidate network to obtain the first generated image and the first restored image. The first candidate network is used for converting the first modality image into the three-dimensional image of the second modality. A corresponding constraint loss of the first candidate network in the three-dimensional image space is determined according to the first generated image and the first restored image so that the manner for training the first candidate network can make the effect of the three-dimensional image generated by the final trained image conversion network better; that is, the training effect of the image conversion network can be improved by introducing the three-dimensional image space in the first candidate network, thereby making the outputted three-dimensional image more accurate.

The image generation apparatus provided in the above-mentioned embodiments is merely exemplified by the division of the above-mentioned functional modules, and in practical application, the above-mentioned functions may be allocated by different functional modules according to needs, i.e., dividing an internal structure of the device into different functional modules to complete all or part of the functions described above. In addition, the image generation apparatus provided in the above-mentioned embodiments and the image generation method embodiment belong to the same idea, and the detailed implementation process thereof is described in detail in the method embodiments, which will not be described again herein.

Figure 10:
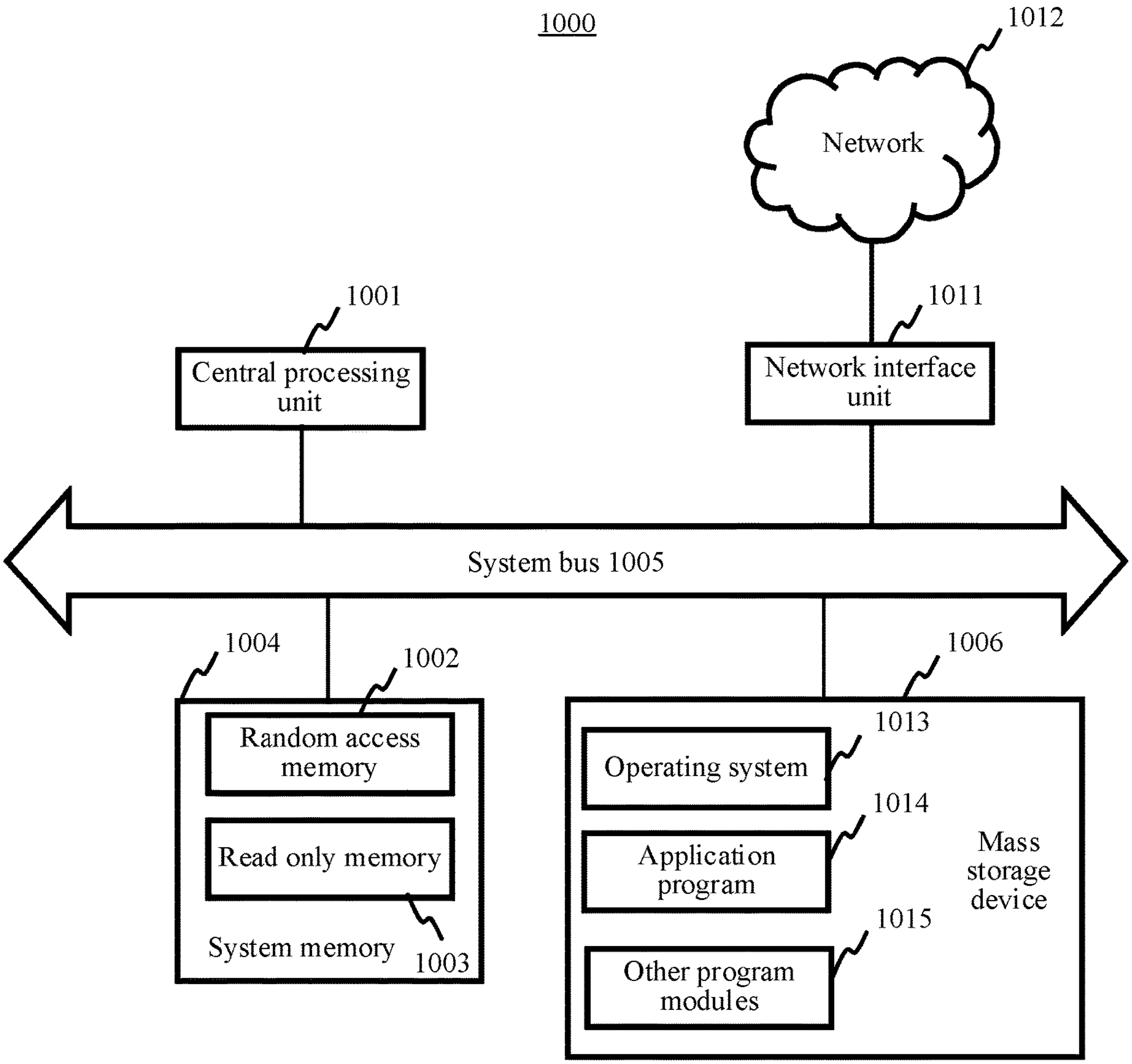
FIG. 10 is a schematic structural diagram of a server provided by an exemplary embodiment of this application.

FIG. 10 illustrates a schematic structural diagram of a server provided by an exemplary embodiment of this application. Specifically,

- a server 1000 includes a central processing unit (CPU) 1001, a system memory 1004 including a random access memory (RAM) 1002 and a read only memory (ROM) 1003, and a system bus 1005 connecting the system memory 1004 and the CPU 1001. The server 1000 also includes a mass storage device 1006 configured to store an operating system 1013, an application program 1014, and other program modules 1015.

The mass storage device 1006 is connected the CPU 1001 by a mass storage controller (not shown) connected to the system bus 1005. The mass storage device 1006 and its associated computer-readable medium provide non-volatile storage for the server 1000.

Without loss of generality, the computer-readable medium may include a computer storage medium and a communication medium. According to various embodiments of this application, the server 1000 may be connected to a network 1012 through a network interface unit 1011 connected to the system bus 1005, or may be connected to other types of networks or remote computer systems (not shown) using the network interface unit 1011.

The above-mentioned memory also includes one or more programs, the one or more programs being stored in the memory and configured to be executed by the CPU.

Embodiments of this application also provide a computer device including a processor and a memory, and the memory has stored therein at least one instruction, at least one program, a set of codes, or a set of instructions, which are loaded and executed by the processor to implement the image generation method provided by the various method embodiments described above.

Embodiments of this application also provide a computer-readable storage medium, and the computer-readable storage medium has stored therein at least one instruction, at least one program, a set of codes, or a set of instructions, which are loaded and executed by the processor to implement the image generation method provided by the various method embodiments described above.

Embodiments of this application provide a computer program product or computer program including a computer instruction, the computer instruction being stored in a computer readable storage medium. The processor of the computer device reads a computer instruction from the computer-readable storage medium, and the processor performs the computer instruction to cause the computer device to perform the image generation method as described in any of the embodiments.

Alternatively, the computer-readable storage medium may include a ROM, a random access memory (RAM), solid state drives (SSD) or optical disk, etc. The RAM may include a resistance random access memory (ReRAM) and a dynamic random access memory (DRAM). The above-mentioned serial numbers of embodiments of this application are merely for description, and do not represent the advantages and disadvantages of the embodiments.

What is claimed is:

1. An image generation method comprising:

- obtaining a modality image corresponding to a first modality;
- performing modality conversion on the modality image through a first candidate network to obtain a generated image corresponding to a second modality, the generated image being a three-dimensional image, and the first modality and the second modality being different from each other;
- performing modality restoration on the generated image through a second candidate network to obtain a restored image corresponding to the first modality;
- obtaining a constraint loss value based on a modality conversion effect of the generated image and a modality restoration effect of the restored image, the constraint loss value indicating a mapping loss in mapping the modality image to a three-dimensional image space by the first candidate network, wherein the constraint loss value includes a texture constraint loss value indicating a texture feature loss in mapping the modality image to the three-dimensional image space by the first candidate network; and training the first candidate network based on the constraint loss value to obtain an image conversion network.

2. The method according to claim 1, wherein:
the modality image is a first modality image;
the constraint loss value includes a dimension conversion loss value; and
obtaining the constraint loss value includes:
obtaining a second modality image, the second modality image being a pre-provided image of the second modality; and
obtaining the dimension conversion loss value based on a first image feature distribution difference between the generated image and the second modality image, and based on a second image feature distribution difference between the first modality image and the restored image, the dimension conversion loss value indicating a loss in an image dimension conversion by the first candidate network performed through the three-dimensional image space.

3. The method according to claim 2, wherein obtaining the dimension conversion loss value based on the first image feature distribution difference, and based on the second image feature distribution difference includes:
determining a discrimination loss based on the first image feature distribution difference;
determining a generation loss based on the second image feature distribution difference; and
taking the generation loss and the discrimination loss as the dimension conversion loss value.

4. The method according to claim 3, wherein determining the discrimination loss based on the first image feature distribution difference includes:
inputting the second modality image into a discriminator, in a discriminative-generative network architecture, of the first candidate network for the discriminator to output a reference prediction result, the reference prediction result indicating a probability of the second modality image being a reference image;
inputting the generated image into the discriminator for the discriminator to output a matching prediction result, the matching prediction result indicating a matching relationship corresponding to the generated image and the second modality image; and
determining the discrimination loss based on the reference prediction result and the matching prediction result.

5. The method according to claim 3, wherein determining the generation loss based on the second image feature distribution difference includes:
determining a first feature representation corresponding to the first modality image;
determining a second feature representation corresponding to the restored image; and
determining the generation loss based on a feature distance between the first feature representation and the second feature representation.

6. The method according to claim 1, wherein performing the modality conversion on the modality image through the first candidate network to obtain the generated image includes:
inputting the modality image into a generator, in a generative adversarial network (GAN) architecture, of the first candidate network for the generator to output the generated image.

7. The method according to claim 1, wherein:
the constraint loss value includes a domain constraint loss value; and
obtaining the constraint loss value includes:
obtaining a first feature distribution of the modality image in the three-dimensional image space;
obtaining a second feature distribution of the generated image in the three-dimensional image space; and
obtaining the domain constraint loss value based on a distance between the first feature distribution and the second feature distribution, the domain constraint loss value indicating a conversion loss from the first feature distribution to the second feature distribution in the three-dimensional image space.

8. The method according to claim 1, wherein:
obtaining the constraint loss value includes:
obtaining a first segmentation result corresponding to the generated image, the first segmentation result indicating a reference probability distribution of the generated image corresponding to the modality image;
obtaining a second segmentation result corresponding to the modality image, the second segmentation result indicating a texture feature corresponding to a pre-provided image of the second modality; and
determining the texture constraint loss value based on a segmentation difference between the first segmentation result and the second segmentation result.

9. The method according to claim 8, wherein obtaining the first segmentation result includes:
inputting the generated image into a splitter for the splitter to perform region segmentation on the generated image to output the first segmentation result.

10. The method according to claim 1, wherein:
the constraint loss value includes a contour constraint loss value; and
obtaining the constraint loss value includes:
inputting the generated image into a discriminator for the discriminator to output a matching prediction result, the matching prediction result indicating a matching relationship corresponding to the generated image and a pre-provided image of the second modality;
inputting the generated image into a splitter for the splitter to perform region segmentation on the generated image to output a segmentation result; and
determining the contour constraint loss value based on the matching prediction result and the segmentation result, the contour constraint loss value indicating a boundary feature loss corresponding to the generated image in the three-dimensional image space.

11. The method according to claim 1, wherein the constraint loss value further includes at least one of: a dimension conversion loss value indicating a loss in an image dimension conversion by the first candidate network performed through the three-dimensional image space; a domain constraint loss value indicating a conversion loss from the first feature distribution to the second feature distribution in the three-dimensional image space; or a contour constraint loss value indicating a boundary feature loss corresponding to the generated image in the three-dimensional image space.

12. A computer device comprising:
one or more processors; and
one or more memories storing at least one program that, when executed by the one or more processors, causes the one or more processors to:
obtain a modality image corresponding to a first modality;
perform modality conversion on the modality image through a first candidate network to obtain a generated image corresponding to a second modality, the generated image being a three-dimensional image, and the first modality and the second modality being different from each other;

perform modality restoration on the generated image through a second candidate network to obtain a restored image corresponding to the first modality;

obtain a constraint loss value based on a modality conversion effect of the generated image and a modality restoration effect of the restored image, the constraint loss value indicating a mapping loss in mapping the modality image to a three-dimensional image space by the first candidate network, wherein the constraint loss value includes a texture constraint loss value indicating a texture feature loss in mapping the modality image to the three-dimensional image space by the first candidate network; and train the first candidate network based on the constraint loss value to obtain an image conversion network.

13. The device according to claim 12, wherein:

the modality image is a first modality image;

the constraint loss value includes a dimension conversion loss value; and the at least one program further causes the one or more processors to:

obtain a second modality image, the second modality image being a pre-provided image of the second modality; and obtain the dimension conversion loss value based on a first image feature distribution difference between the generated image and the second modality image, and based on a second image feature distribution difference between the first modality image and the restored image, the dimension conversion loss value indicating a loss in an image dimension conversion by the first candidate network performed through the three-dimensional image space.

14. The device according to claim 13, wherein the at least one program further causes the one or more processors to:

determine a discrimination loss based on the first image feature distribution difference;

determine a generation loss based on the second image feature distribution difference; and take the generation loss and the discrimination loss as the dimension conversion loss value.

15. The device according to claim 14, wherein the at least one program further causes the one or more processors to:

input the second modality image into a discriminator, in a discriminative-generative network architecture, of the first candidate network for the discriminator to output a reference prediction result, the reference prediction result indicating a probability of the second modality image being a reference image;

input the generated image into the discriminator for the discriminator to output a matching prediction result, the matching prediction result indicating a matching relationship corresponding to the generated image and the second modality image; and determine the discrimination loss based on the reference prediction result and the matching prediction result.

16. The device according to claim 14, wherein the at least one program further causes the one or more processors to:

determine a first feature representation corresponding to the first modality image;

determine a second feature representation corresponding to the restored image; and determine the generation loss based on a feature distance between the first feature representation and the second feature representation.

17. The device according to claim 12, wherein the at least one program further causes the one or more processors to:

input the modality image into a generator, in a generative adversarial network (GAN) architecture, of the first candidate network for the generator to output the generated image.

18. The device according to claim 12, wherein:

the constraint loss value includes a domain constraint loss value; and the at least one program further causes the one or more processors to:

obtain a first feature distribution of the modality image in the three-dimensional image space;

obtain a second feature distribution of the generated image in the three-dimensional image space; and obtain the domain constraint loss value based on a distance between the first feature distribution and the second feature distribution, the domain constraint loss value indicating a conversion loss from the first feature distribution to the second feature distribution in the three-dimensional image space.

19. The device according to claim 12, wherein:

the at least one program further causes the one or more processors to:

obtain a first segmentation result corresponding to the generated image, the first segmentation result indicating a reference probability distribution of the generated image corresponding to the modality image;

obtain a second segmentation result corresponding to the modality image, the second segmentation result indicating a texture feature corresponding to a pre-provided image of the second modality; and determine the texture constraint loss value based on a segmentation difference between the first segmentation result and the second segmentation result.

20. A non-transitory computer-readable storage medium storing at least one program that, when executed by one or more processors, causes the one or more processors to:

obtain a modality image corresponding to a first modality;

perform modality conversion on the modality image through a first candidate network to obtain a generated image corresponding to a second modality, the generated image being a three-dimensional image, and the first modality and the second modality being different from each other;

perform modality restoration on the generated image through a second candidate network to obtain a restored image corresponding to the first modality;

obtain a constraint loss value based on a modality conversion effect of the generated image and a modality restoration effect of the restored image, the constraint loss value indicating a mapping loss in mapping the modality image to a three-dimensional image space by the first candidate network, wherein the constraint loss value includes a texture constraint loss value indicating a texture feature loss in mapping the modality image to the three-dimensional image space by the first candidate network; and train the first candidate network based on the constraint loss value to obtain an image conversion network.

* * * * *